(12) United States Patent
Szczerba et al.

(10) Patent No.: US 11,854,403 B2
(45) Date of Patent: Dec. 26, 2023

(54) SYSTEM AND METHOD FOR PROVIDING A BLIND REVEAL WARNING ON AN AUGMENTED REALITY DISPLAY

(71) Applicant: GM Global Technology Operations LLC, Detroit, MI (US)

(72) Inventors: Joseph F. Szczerba, Grand Blanc, MI (US); John P. Weiss, Shelby Township, MI (US); Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 159 days.

(21) Appl. No.: 17/700,790

(22) Filed: Mar. 22, 2022

(65) Prior Publication Data

US 2023/0306850 A1    Sep. 28, 2023

(51) Int. Cl.
| | |
|---|---|
| *G06T 7/70* | (2017.01) |
| *G06T 19/00* | (2011.01) |
| *G06F 3/01* | (2006.01) |
| *G08G 1/16* | (2006.01) |
| *B60K 35/00* | (2006.01) |

(52) U.S. Cl.
CPC ............ *G08G 1/167* (2013.01); *B60K 35/00* (2013.01); *G06F 3/013* (2013.01); *G06T 7/70* (2017.01); *G06T 19/006* (2013.01); *B60K 2370/1529* (2019.05); *B60K 2370/177* (2019.05); *B60K 2370/178* (2019.05); *G06T 2207/30248* (2013.01)

(58) Field of Classification Search
CPC ......... G06F 3/013; G06T 7/70; G06T 19/006; G06T 2207/30248; B60K 2370/1529; B60K 2370/177

See application file for complete search history.

(56) References Cited

U.S. PATENT DOCUMENTS

| | | | | |
|---|---|---|---|---|
| 2023/0012629 A1* | 1/2023 | Shin | .......................... | G08G 1/04 |
| 2023/0021000 A1* | 1/2023 | Okonogi | ............... | B60W 30/16 |

FOREIGN PATENT DOCUMENTS

| | | |
|---|---|---|
| DE | 102013200862 A1 | 7/2013 |
| DE | 102012023108 A1 | 6/2014 |
| DE | 102016009762 A1 | 2/2018 |

* cited by examiner

*Primary Examiner* — Grace Q Li

(74) *Attorney, Agent, or Firm* — Vivacqua Crane PLLC

(57) ABSTRACT

A method for providing a blind reveal warning on multi-focal plane augmented reality display includes receiving remote-vehicle data, which includes information about a plurality of remote vehicles. The remote vehicles include a first remote vehicle located directly in front of the host vehicle and a second remote vehicle in front of the first remote vehicle. The method further includes determining an approach rate of the first remote vehicle to the second remote vehicle. The method further includes determining a probability that the first remote vehicle will perform a blind reveal and comparing that probability with a predetermined threshold value. The method further includes, in response to determining that the probability that the first remote vehicle will perform the blind reveal is greater than the predetermined threshold value, transmitting a command signal to the display of the host vehicle to display a virtual image.

20 Claims, 6 Drawing Sheets

SYSTEM AND METHOD FOR PROVIDING A BLIND REVEAL WARNING ON AN AUGMENTED REALITY DISPLAY

INTRODUCTION

The present disclosure relates to a system and method for providing a blind reveal warning on multi-focal plane augmented reality display.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some vehicles include displays to provide information to a vehicle user. However, these displays do not necessarily present blind reveal warnings. In the present disclosure, the term "blind reveal" means an occurrence where a host vehicle, a first remote vehicle, and a second remote vehicle are on a same lane, wherein the first remote vehicle approaches the second remote vehicle while a speed of the second remote vehicle is less than a speed of the first remote vehicle and then the first remote vehicle switches lanes, thereby revealing the second remote vehicle to a vehicle user of the host vehicle. Providing blind reveal warnings may help the vehicle user prognosticate blind reveals situations, thereby providing the vehicle user with enough time to make the appropriate driving decisions to prevent the host vehicle from coming into contact with the second remote vehicle before the first remote vehicle switches lanes. It is therefore desirable to develop a system and a method for providing blind reveal warnings on multi-focal plane augmented reality display based on real-time vehicle positioning.

SUMMARY

The present disclosure describes a system and method that presents a warning of hidden stopped or slowed vehicles to the driver on a multi-focal plane augmented reality display. Using V2V communication, if the system detects that the vehicle of the host vehicle is encroaching on another object over a given speed threshold, the multi-focal plane augmented reality display presents the driver with a warning of slow or stopped traffic ahead before a blind reveal situation occurs.

In an aspect of the present disclosure, the method for providing a blind reveal warning on a multi-focal plane augmented reality display includes receiving remote-vehicle data. The remote-vehicle data includes information about a plurality of remote vehicles. Each of the plurality of remote vehicle is located within a predetermined distance from a host vehicle. The plurality of remote vehicles includes a first remote vehicle located directly in front of the host vehicle. The plurality of remote vehicles includes a second remote vehicle directly in front of the first remote vehicle. The method further includes determining an approach rate of the first remote vehicle to the second remote vehicle. The approach rate is a speed at which the first remote vehicle is approaching the second remote vehicle relative to a speed of the second remote vehicle. The method further includes determining a probability that the first remote vehicle will perform a blind reveal based on the approach rate. The blind reveal is an occurrence where the first remote vehicle and the second remote vehicle are on a same lane, the first remote vehicle approaches the second remote vehicle while a speed of the second remote vehicle is less than a speed of the first remote vehicle and then the first remote vehicle switches lanes, thereby revealing the second remote vehicle to a vehicle user of the host vehicle. The method further includes comparing the probability that the first remote vehicle will perform the blind reveal with a predetermined threshold value to determine whether the probability that the first remote vehicle will perform the blind reveal is greater than the predetermined threshold value. The method further includes, in response to determining that the probability that the first remote vehicle will perform the blind reveal is greater than the predetermined threshold value, transmitting a command signal to the multi-focal plane augmented reality display of the host vehicle to display a virtual image on the multi-focal plane augmented reality display. The virtual image includes a visible alert that warns the vehicle user of the host vehicle that the blind reveal is probable. The method described in this paragraph improves vehicle technology by providing vehicle users with a blind reveal warning.

In an aspect of the present disclosure, the remote-vehicle data includes information about a speed, a location, an acceleration, a trajectory, and a behavior of each of the plurality of remote vehicles.

In an aspect of the present disclosure, the method further includes determining that the probability that the first remote vehicle will perform the blind reveal is not greater than the predetermined threshold value. The method further includes, in response to determining that the probability that the first remote vehicle will perform the blind reveal is not greater than the predetermined threshold value, the command signal is not transmitted to the multi-focal plane augmented reality display of the host vehicle.

In an aspect of the present disclosure, the method further includes determining a location of the host vehicle relative to the first remote vehicle.

In an aspect of the present disclosure, the method further includes determining a size and a type of the virtual image based on the probability that the first remote vehicle will perform the blind reveal.

In an aspect of the present disclosure, transmitting the command signal to the multi-focal plane augmented reality display includes commanding the multi-focal plane augmented reality display of the host vehicle to display the virtual image on the multi-focal plane augmented reality display with the size and the type previously determined based on the probability that the first remote vehicle will perform the blind reveal.

In an aspect of the present disclosure, the method further includes determining a location of eyes of the vehicle user of the host vehicle and determining a location of the virtual image based on the location of the eyes of the vehicle user. Transmitting the command signal to the multi-focal plane augmented reality display includes commanding the multi-focal plane augmented reality display of the host vehicle to display the virtual image at the location determined based on the location of the eyes of the vehicle user.

In an aspect of the present disclosure, the method further includes generating the virtual image at the location previously determined based on the location of the eyes of the vehicle user and with the size and the type previously determined based on the probability that the first remote vehicle will perform the blind reveal. The virtual image is displayed on a windshield of the host vehicle.

In an aspect of the present disclosure, the method further includes generating the virtual image at the location previously determined based on the location of the eyes of the vehicle user and with the size and the type previously determined based on the probability that the first remote vehicle will perform the blind reveal. The virtual image is displayed on a cluster display of the host vehicle.

In an aspect of the present disclosure, the method further includes determining whether a driving scenario is complete. The driving scenario is a situation where a blind reveal takes place. The driving scenario is complete once the first remote vehicle switches lanes.

In an aspect of the present disclosure, the method further includes, in response to determining that the driving scenario is complete, transmitting an off signal to the multi-focal plane augmented reality display to discontinue showing the virtual image on the multi-focal plane augmented reality display.

The present disclosure also describes a system for providing a blind reveal warning on a multi-focal plane augmented reality display. In an aspect of the present disclosure, the system includes a plurality of sensors in a host vehicle, a transceiver configured to receive V2V communications, a controller in communication with the plurality of sensors and the transceiver. The controller is configured to receive remote-vehicle data from at least one of the transceivers or the plurality of sensors. The remote-vehicle data includes information about a plurality of remote vehicles. Each of the plurality of remote vehicle is located within a predetermined distance from a host vehicle. The plurality of remote vehicles includes a first remote vehicle located directly in front of the host vehicle. The plurality of remote vehicles includes a second remote vehicle directly in front of the first remote vehicle. The controller is configured to determine an approach rate of the first remote vehicle relative to the second remote vehicle. The controller is configured to determine a probability that the first remote vehicle will perform a blind reveal based on the approach rate. The blind reveal is an occurrence where the first remote vehicle and the second remote vehicle are on a same lane, the first remote vehicle approaches the second remote vehicle while a speed of the second remote vehicle is less than a speed of the first remote vehicle and then the first remote vehicle switches lanes, thereby revealing the second remote vehicle to a vehicle user of the host vehicle. The controller is configured to compare the probability that the first remote vehicle will perform the blind reveal with a predetermined threshold value to determine whether the probability that the first remote vehicle will perform the blind reveal is greater than the predetermined threshold value. The controller is configured to, in response to determining that the probability that the first remote vehicle will perform the blind reveal is greater than the predetermined threshold value, transmit a command signal to the multi-focal plane augmented reality display of the host vehicle to display a virtual image on the multi-focal plane augmented reality display. The virtual image includes a visible alert that warns the vehicle user of the host vehicle that the blind reveal is probable.

In an aspect of the present disclosure, the remote-vehicle data includes information about a speed, a location, an acceleration, a trajectory, and a behavior of each of the plurality of remote vehicles.

In an aspect of the present disclosure, the controller is further configured to determine that the probability that the first remote vehicle will perform the blind reveal is not greater than the predetermined threshold value. In response to determining that the probability that the first remote vehicle will perform the blind reveal is not greater than the predetermined threshold value, the controller does not transmit the command signal to the multi-focal plane augmented reality display of the host vehicle.

In an aspect of the present disclosure, the controller is configured to determine a location of the host vehicle relative to the first remote vehicle.

In an aspect of the present disclosure, the controller is configured to determine a size and a type of the virtual image based on the probability that the first remote vehicle will perform the blind reveal. The controller is configured to command the multi-focal plane augmented reality display of the host vehicle to display the virtual image on the multi-focal plane augmented reality display with the size and the type previously determined based on the probability that the first remote vehicle will perform the blind reveal.

In an aspect of the present disclosure, the controller is configured to determine a location of eyes of the vehicle user of the host vehicle and determine a location of the virtual image based on the location of the eyes of the vehicle user. The controller is configured to command the multi-focal plane augmented reality display of the host vehicle to display the virtual image at the location determined based on the location of the eyes of the vehicle user.

In an aspect of the present disclosure, the controller is configured to generate the virtual image at the location previously determined based on the location of the eyes of the vehicle user and with the size and the type previously determined based on the probability that the first remote vehicle will perform the blind reveal. The virtual image is displayed on a windshield of the host vehicle.

In an aspect of the present disclosure, the controller is configured to generate the virtual image at the location previously determined based on the location of the eyes of the vehicle user and with the size and the type previously determined based on the probability that the first remote vehicle will perform the blind reveal. The virtual image is displayed on a cluster display of the host vehicle.

In an aspect of the present disclosure, the controller is configured to determine whether a driving scenario is complete. The driving scenario is a situation where a blind reveal takes place, and the driving scenario is complete once the first remote vehicle switches lanes.

In an aspect of the present disclosure, the controller is configured to, in response to determining that the driving scenario is complete, transmit an off signal to the multi-focal plane augmented reality display to turn off to discontinue showing the visible alert on the multi-focal plane augmented reality display.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
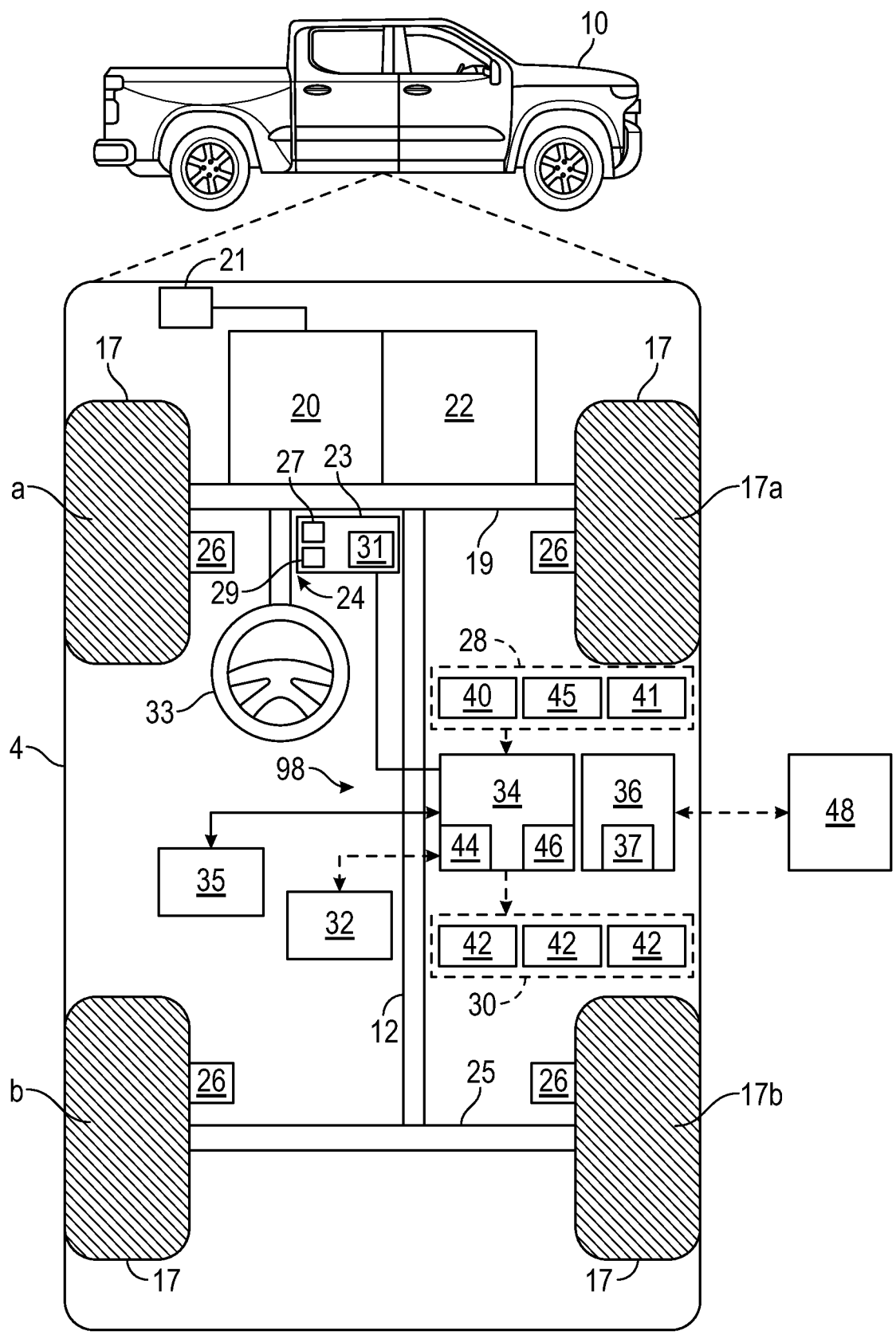
FIG. 1 is a block diagram depicting an embodiment of a vehicle including a system for providing a blind reveal warning on a multi-focal plane augmented reality display.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a host vehicle 10 generally includes a chassis 12, a body 14, front and rear wheels 17 and may be referred to as a vehicle system. In the depicted embodiment, the host vehicle 10 includes two front wheels 17a and two rear wheels 17b. The body 14 is arranged on the chassis 12 and substantially encloses components of the host vehicle 10. The body 14 and the chassis 12 may jointly form a frame. The wheels 17 are each rotationally coupled to the chassis 12 near a respective corner of the body 14. The host vehicle 10 includes a front axle 19 coupled to the front wheels 17a and a rear axle 25 coupled to the rear wheels 17b.

In various embodiments, the host vehicle 10 may be an autonomous vehicle and a control system 98 is incorporated into the host vehicle 10. The control system 98 may be referred to as the system or the system for providing a blind reveal warning on a display 29. The host vehicle 10 is, for example, a vehicle that is automatically controlled to carry passengers from one location to another. The host vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the host vehicle 10 may be a so-called a Level Two, a Level Three, Level Four, or Level Five automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle operator is only expected to be responsible for the DDT-fallback when the host vehicle 10 essentially "asks" the driver to take over if something goes wrong or the vehicle is about to leave the zone where it is able to operate. In Level 2 vehicles, systems provide steering, brake/acceleration support, lane centering, and adaptive cruise control. However, even if these systems are activated, the vehicle operator at the wheel must be driving and constantly supervising the automated features.

As shown, the host vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The host vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the host vehicle 10. The sensors 40 are in communication with the controller 34 and may include, but are not limited to, one or more radars, one or more light detection and ranging (lidar) sensors, one or more proximity sensors, one or more odometers, one or more ground penetrating radar (GPR) sensors, one or more steering angle sensors, one or more global positioning systems (GPS) transceivers 45, one or more tire pressure sensors, one or more cameras 41 (e.g., optical cameras and/or infrared cameras), one or more gyroscopes, one or more accelerometers, one or more inclinometers, one or more speed sensors, one or more ultrasonic sensors, one or more inertial measurement units (IMUs) and/or other sensors. Each sensor 40 is configured to generate a signal that is indicative of the sensed observable conditions of the exterior environment and/or the interior environment of the host vehicle 10. Because the sensor system 28 provides data to the controller 34, the sensor system 28 and its sensors 40 are considered sources of information (or simply sources).

The sensor system 28 includes one or more Global Navigation Satellite System (GNSS) transceivers 45 (e.g., Global Positioning System (GPS) transceivers) configured to detect and monitor the route data (i.e., route information). The GNSS transceiver 45 is configured to communicate with a GNSS to locate the position of the host vehicle 10 in the globe. The GNSS transceiver 45 is in electronic communication with the controller 34.

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

The data storage device 32 stores data for use in automatically controlling the host vehicle 10. In various embodiments, the data storage device 32 stores defined maps of the navigable environment. In various embodiments, the defined maps may be predefined by and obtained from a remote system. For example, the defined maps may be assembled by the remote system and communicated to the host vehicle 10 (wirelessly and/or in a wired manner) and stored in the data storage device 32. The data storage device 32 may be part of the controller 34, separate from the controller 34, or part of the controller 34 and part of a separate system.

The host vehicle 10 may further include one or more airbags 35 in communication with the controller 34 or another controller of the host vehicle 10. The airbag 35 includes an inflatable bladder and is configured to transition between a stowed configuration and a deployed configuration to cushion the effects of an external force applied to the host vehicle 10. The sensors 40 may include an airbag sensor, such as an IMU, configured to detect an external force and generate a signal indicative of the magnitude of such external force. The controller 34 is configured to command the airbag 35 to deploy based on the signal from one or more sensors 40, such as the airbag sensor. Accordingly, the controller 34 is configured to determine when the airbag 35 has been deployed.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the host vehicle 10. The controller 34 of the host vehicle 10 may be referred to as a vehicle controller and may programmed to execute a method 100 (FIG. 7) and/or method 200 (FIG. 8) as described in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the host vehicle 10, and generate control signals to the actuator system 30 to automatically control the components of the host vehicle 10 based on the logic, calculations, methods, and/or algorithms. Although a single controller 34 is shown in FIG. 1, embodiments of the host vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the host vehicle 10.

In various embodiments, one or more instructions of the controller 34 are embodied in the control system 98. The host vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the host vehicle 10. The user interface 23 is in electronic communication with the controller 34 and is configured to receive inputs by a user (e.g., a vehicle operator or a vehicle passenger). For example, the user interface 23 may include a touch screen and/or buttons configured to receive inputs from a vehicle user. Accordingly, the controller 34 is configured to receive inputs from the user via the user interface 23.

The display 29 is configured to display information to the user (e.g., vehicle operator or passenger) and may be an augmented reality (AR) display. In the present disclosure, the term "AR display" means a display that presents information to users, while still allowing sight of the outside world. In certain embodiments, the display 29 may be configured as a head-up display (HUD), and/or an information cluster display. Accordingly, the display 29 may be an AR HUD or an AR information cluster display. In an AR HUD, images are projected on a windshield 39 (FIG. 6) of the host vehicle 10. In an AR information cluster display, the information cluster panel of the host vehicle 10 includes a screen that presents an image of the front of the host vehicle 10 captured by one or more cameras 41 (i.e., a forward image) and virtual images presented on that forward image. As discussed below, the display 29 may be a multi-focal plane AR display to facilitate manipulation (e.g., size, location, and type) of the virtual images.

The communication system 36 is in communication with the controller 34 and is configured to wirelessly communicate information to and from other entities 48, such as but not limited to, other vehicles ("V2V" communication), infrastructure ("V2I" communication), remote systems at a remote call center (e.g., ON-STAR by GENERAL MOTORS) and/or personal devices. In certain embodiments, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals, such as cooperative sensing messages (CSMs). The communication transceivers 37 may be considered sensors 40. The communication system 36 is configured to wirelessly communicate information between the host vehicle 10 and another vehicle. Further, the communication system 36 is configured to wirelessly communicate information between the host vehicle 10 and infrastructure or other vehicles.

Figure 2:
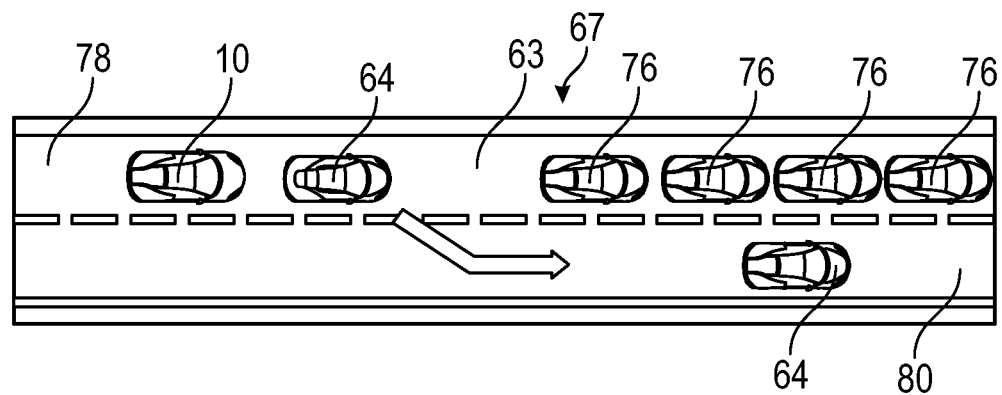
FIG. 2 is a schematic diagram illustrating a blind reveal.
Figure 3:
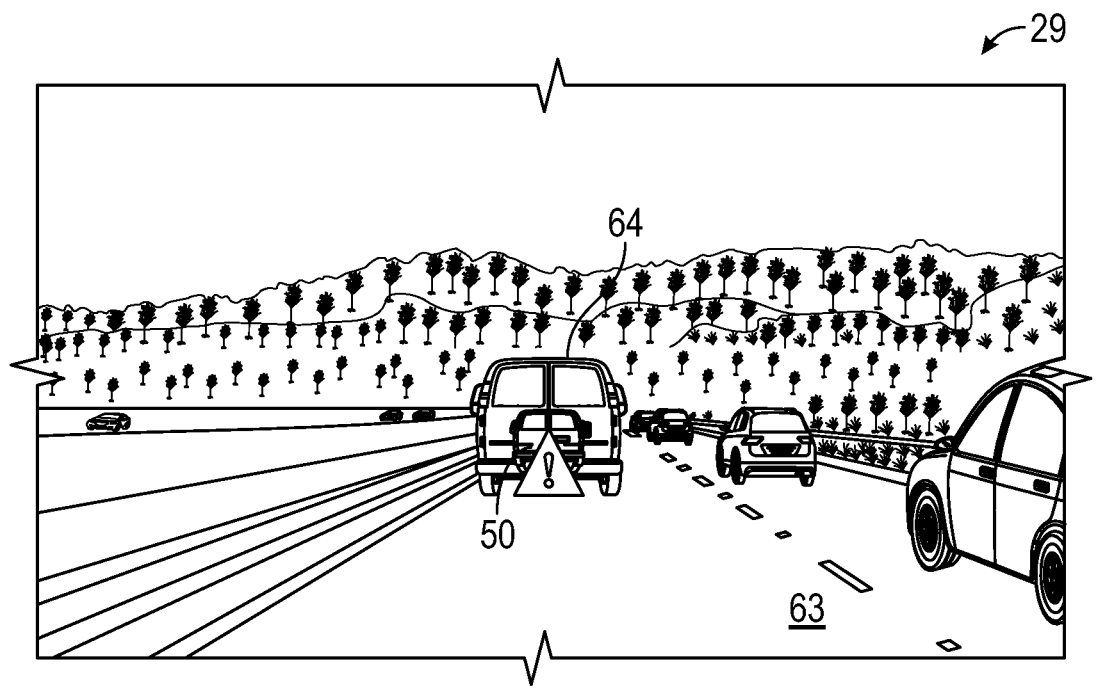
FIG. 3 is a schematic front view of the multi-focal plane augmented reality display of FIG. 1, wherein the multi-focal plane augmented reality display provides a blind reveal warning.

With reference to FIGS. 1, 2, and 3, the system 98 is configured to command the display 29, such as an AR HUD or an AR information cluster display, for providing a blind reveal warning on multi-focal plane augmented reality display using data received from the sensors 40 in the host vehicle 10, data received from other entities 48 through the communication system 36 (e.g., V2V communications), and/or eye-tracking data. In doing so, the display 29 shows the blind reveal warning in a contextual manner by augmenting the road scene with conformal graphics. In the present disclosure, the term "conformal graphic" means syntenic generated content (i.e., a virtual image 50) presented as part of the outside world. Accordingly, the display 29 is a conformal display. In the present disclosure, the term "conformal display" means a display that has the ability to represent synthetically generated content (i.e., one or more virtual images 50) as part of the outside world.

FIG. 2 schematically illustrates a blind reveal situation. As discussed above, a blind reveal situation occurs when the host vehicle 10, a first remote vehicle 64, and a second remote vehicle 76 are on a same lane (i.e., a first lane 78). In a blind reveal, the first remote vehicle 64 approaches the second remote vehicle 76 while the speed of the second remote vehicle 76 is less than the speed of the first remote vehicle 64. It is envisioned that the second remote vehicle 76 may be stationary or moving at low speeds. Further, it is contemplated that there may be more than one second remote vehicle 76 stopped or moving at low speeds. Then, in the blind reveal, the first remote vehicle 64 switches from the first lane 78 to a directly adjacent lane (i.e., a second lane 80), thereby revealing the second remote vehicle 76 to a vehicle user of the host vehicle 10. In blind reveal situations, it is desirable to provide blind reveal warnings to help the vehicle user predict blind reveals situations, thereby providing the vehicle user of the host vehicle 10 with enough time to make the appropriate driving decisions to prevent the host vehicle 10 from coming into contact with the second remote vehicle 76 before the first remote vehicle 64 switches lanes. The first remote vehicle 64 and the second remote vehicle 76 are part of a plurality of remote vehicles 67 located nearby the host vehicle 10. The plurality of remote vehicles 67 are located within a predetermined distance (e.g., 1 mile) from the host vehicle 10. The first remote vehicle 64 is directly in front of the host vehicle 10, such that no other vehicle is located between the first remote vehicle 64 and the host vehicle 10. At least one of the second remote vehicles 76 is directly in front of the first remote vehicle 64, such that no other vehicle is located between the first remote vehicle 64 and the second remote vehicle 76.

In FIG. 3, the display 29 shows a virtual image 50 representing a blind reveal warning as part of the outside world. While FIG. 3 shows one virtual image 50, it is envisioned that the display 29 may show more than one virtual image 50. In the embodiment depicted in FIG. 2, the virtual image 50 may include a graphical image of a vehicle, a triangle next to the graphical image of the vehicle, and an exclamation mark inside the triangle. It is envisioned, however, that the virtual image 50 may have other configurations indicative of a blind reveal warning. Regardless of its configuration, the virtual image 50 may be located in in front of the first remote vehicle 64 to provide an indication that the second remote vehicle 76 is in front of the first remote vehicle 64. Because the display 29 may be an AR display, FIG. 3 shows a view of a roadway 63 through a windshield 39 (FIG. 6) in addition to the virtual image 50 or an image of the roadway 63 with the virtual images 50. In the present disclosure, the term "roadway" means an open way for vehicles 10. In FIG. 3, the size of the virtual image 50 may be inversely proportional to the distance from the host vehicle 10 to the second remote vehicle 76. Irrespective of its size, the virtual image 50 includes a visible alert that warns the vehicle user of the host vehicle 10 that the blind reveal is probable or likely.

Figure 4:
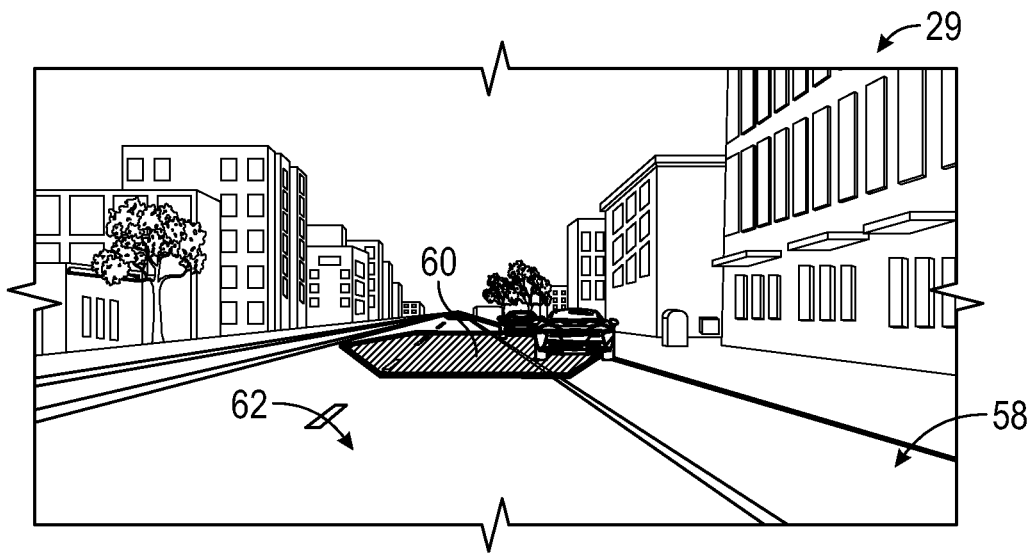
FIG. 4 is a schematic front view of the multi-focal plane augmented reality display of FIG. 1, highlighting a second image plane of the multi-focal plane augmented reality display of FIG. 1.
Figure 5:
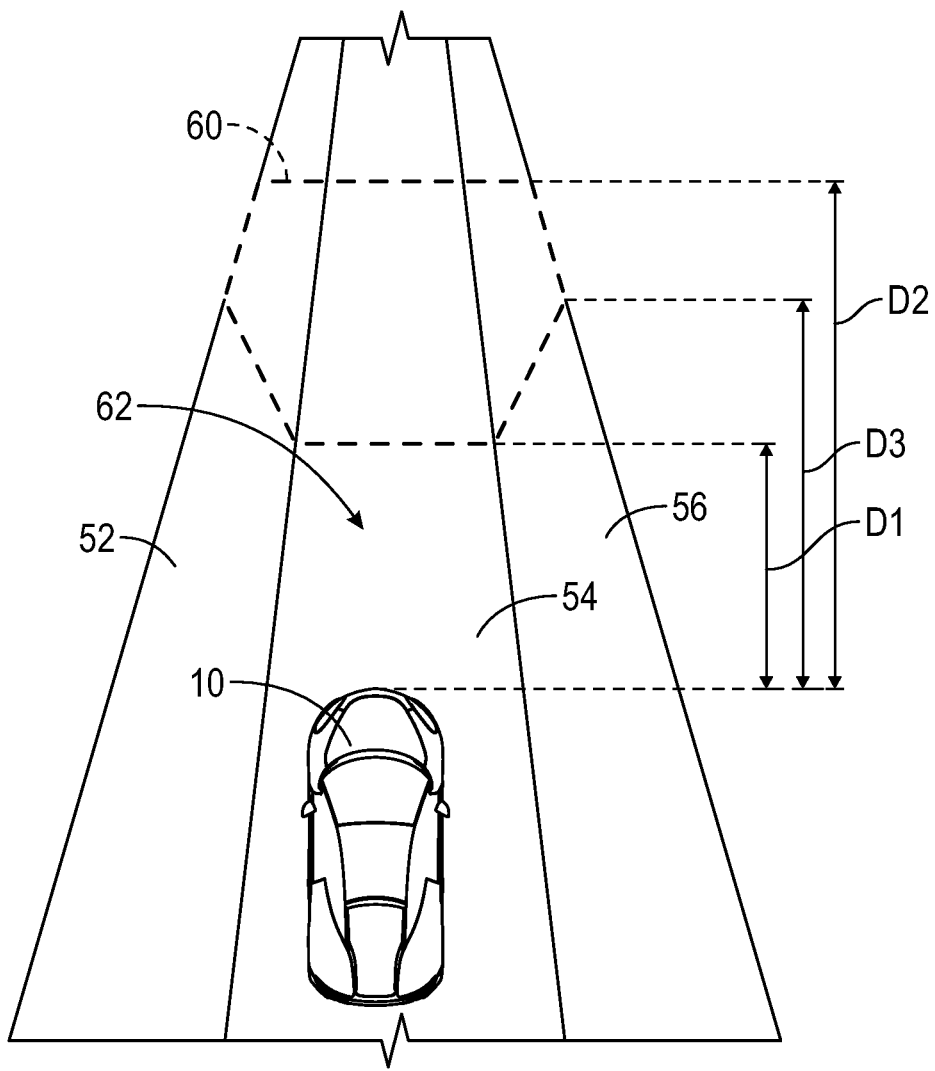
FIG. 5 is a schematic diagram of the second image plane of the multi-focal plane augmented reality display of FIG. 1.

With reference to FIGS. 4 and 5, the display 29 may be a multi-focal plane AR display as mentioned above. In this case, the display 29 has a first image plane 58 and a second image plane 60. The first image plane 58 shows the view of the outside world, and the second image plane 60 is reserved for displaying the virtual images 50 (FIG. 2). The second image plane 60 spans multiple lanes and the virtual images 50 appear at a location farther on the roadway surface 62 relative to the first image plane 58. For instance, as shown in FIG. 5, the second image plane 60 covers the left lane 52, the central lane 54, and the right lane 56. As a non-limiting example, in the central lane 54, the second image plane 60 starts at a first predetermined distance D1 (e.g., twenty-five meters) from the host vehicle 10 and ends at a second predetermined distance D2 (e.g., ninety meters) from the host vehicle 10. Regardless of the specific distances, the second predetermined distance D2 is greater than the first predetermined distance D1 to help the vehicle user see the virtual images 50 (FIG. 3). In the left lane 52 and the right lane 56, the second image plane 60 is delimited by a sloped boundary that starts at the first predetermined distance D1 from the host vehicle 10 and ends at a third predetermined distance D3 (e.g., fifty meters) from the host vehicle 10. The third predetermined distance D3 is greater than the first predetermined distance D1 and less than the second predetermined distance D2 to help the vehicle user see the virtual images 50 (FIG. 3). As used herein, the term "multi-focal plane AR display" means an AR display that presents images in more than one image plane, wherein the image planes are at different locations. It is desirable to use a multi-focal plane AR display in the presently disclosed system 98 to easily change the size, type, and/or location of the virtual images 50 with respect to the view of the outside world.

Figure 6:
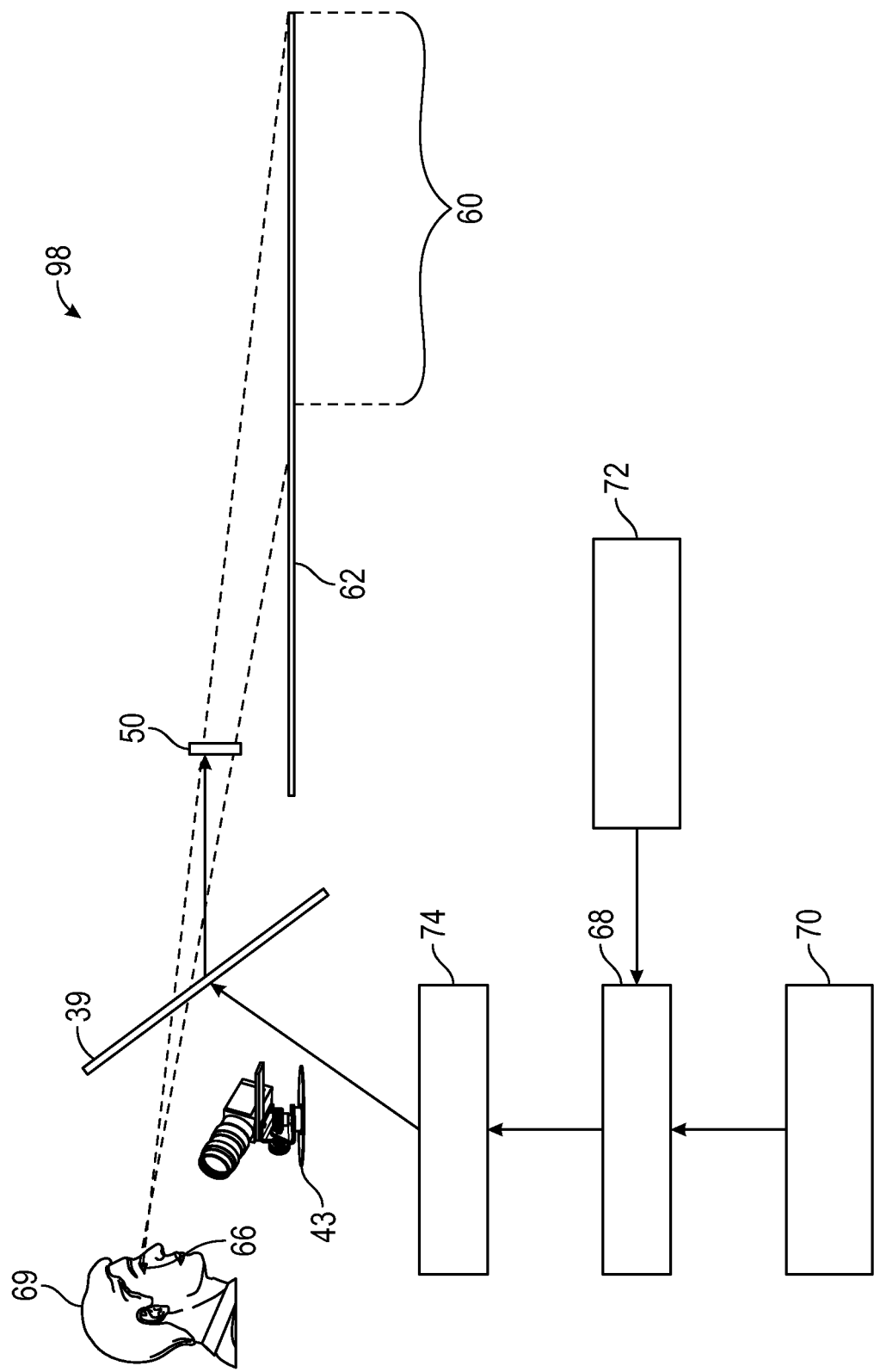
FIG. 6 is a schematic diagram of part of the system for providing a blind reveal warning on the multi-focal plane augmented reality display of FIG. 1.

With reference to FIG. 6, the system 98 includes a user tracker 43 (e.g., eye tracker and/or head tracker) configured to track the position and movement of the eyes 66 or the head 69 of the vehicle user. In the depicted embodiment, the user tracker may be configured as one or more of cameras 41 of the host vehicle 10. As discussed above, the cameras 41 are considered sensors 40 of the host vehicle 10. As a sensor 40, the user tracker 43 is in communication with the controller 34, which includes a system manager 68. During operation of the system 98, the system manager 68 receives at least a first input 70 and a second input 72. The first input 70 is indicative of the position of the vehicle in space (i.e., the vehicle location in space), and the second input 72 is indicative of the vehicle user position in the host vehicle 10 (e.g., the position of the eyes and/or head of the user in the host vehicle 10). The first input 70 may include data such as GNSS data (e.g., GPS data), vehicle speed roadway curvature, and vehicle steering, and this data may be collected from the sensors 40 of the host vehicle 10 and/or other entities 48 through the communication system 36 of the host vehicle 10. The second input 72 may be received from the user tracker (e.g., eye tracker and/or head tracker). The system manager 68 is configured to determine (e.g., compute) the type, size, shape, and color of the conformal graphics (i.e., virtual images 50) based on the first input 70 (i.e., the vehicle location in space), the second input 72 (e.g., the position of the eyes and/or head of the user in the host vehicle 10), and the sensed vehicle driving environment (which may be obtained through the sensors 40). The type, size, shape, and color of the conformal graphics of the virtual image 50 may be collectively referred to as the virtual image characteristics.

With continued reference to FIG. 6, the system 98 further includes an image engine 74, which is part of the display 29, and may be an integrated circuit configured to generate the virtual images 50. These generated virtual images 50 are then projected on the windshield 39 (if the display 29 is a HUD) to show the virtual images 50 on the second image plane 60 along the roadway surface 62.

Figure 7:
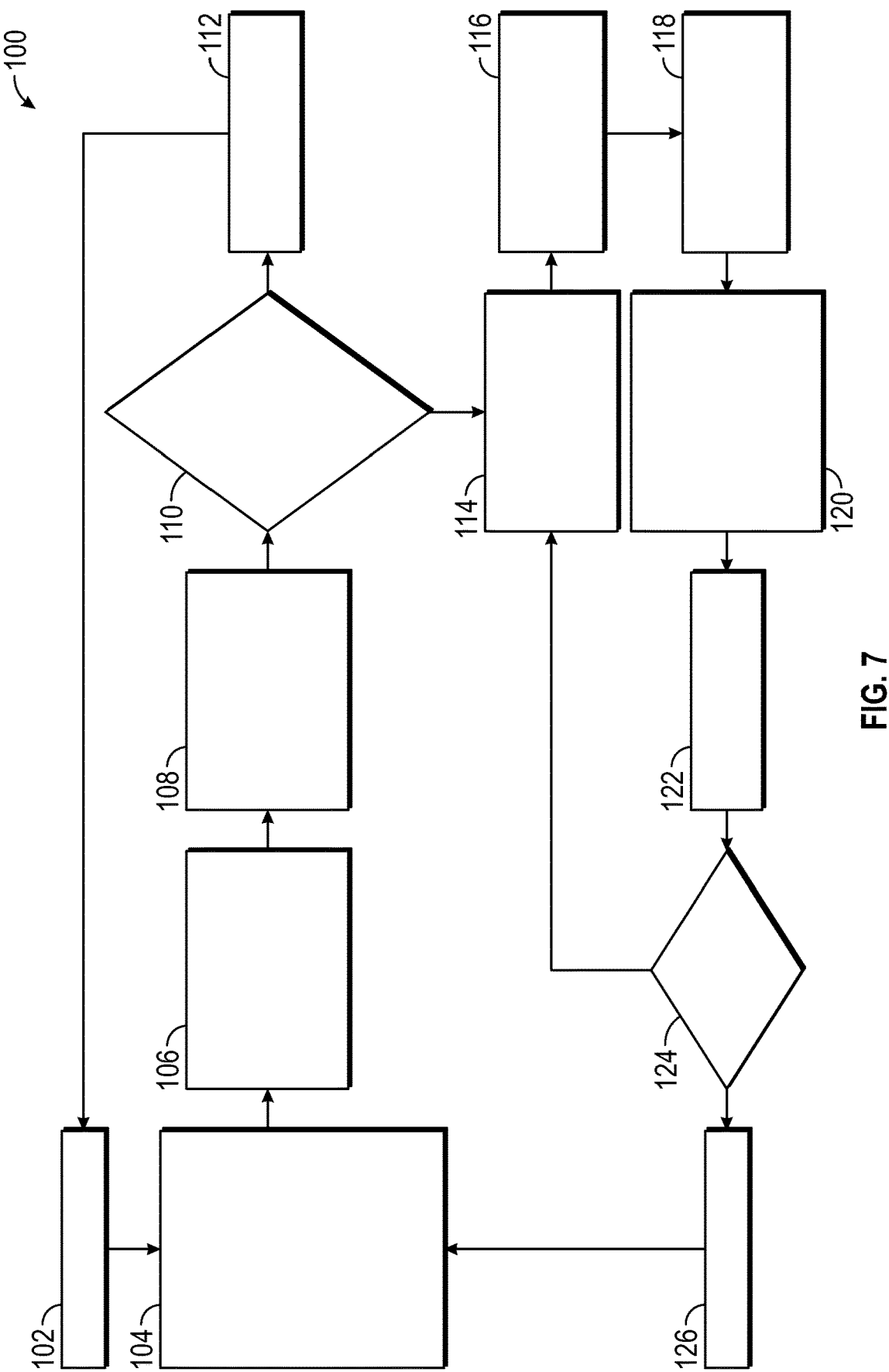
FIG. 7 is a flowchart of a method for a blind reveal warning on a multi-focal plane augmented reality display.

FIG. 7 is a flowchart of the method 100 for providing a blind reveal warning on the display 29 (e.g., an AR display). The method 100 begins at block 102, in which the controller 34 determines that the host vehicle 10 is being driven using, for example, signals generated by the sensors 40. For example, the controller 34 may receive data from one of the sensors 40, such as a speed sensor, to determine that the host vehicle 10 is moving. Then, the method 100 proceeds to block 104.

At block 104, the controller 34 determines receives remote-vehicle data. As used herein, the term "remote-vehicle data" means information about the movement and/or location of one or more remote vehicles 67 located within a predetermined distance (e.g., one mile) from the host vehicle 10. The remote-vehicle data may include, but is not limited to, the location, speed, acceleration, trajectory, steering angle, and/or behavior of each of the remote vehicles 67 within the predetermined distance from the host vehicle 10. In the present disclosure, the term "behavior" means a history of the driving pattern of at least one of the remote vehicles 67. To obtain the remote-vehicle data, the controller 34 may receive at least one signal from one or more sensors 40, such as cameras 41, GNSS transceivers 45 (e.g., Global Positioning System (GPS) transceivers), data from the internet, roadway databases and/or data from the remote vehicles 67 via the communication transceivers 37 using V2V communication. Accordingly, the controller 34 may determine the location and movements of the remote vehicles 67 along the route of the host vehicle 10 using, for example, the remote-vehicle data received from the GNSS transceiver 45, another sensor 40, or another suitable source of information, such as the remote vehicles 67. At block 104, the controller 34 may also determine the location of the host vehicle 10 relative to the first remote vehicle 64. The method 100 then proceeds to block 106.

At block 106, the controller 34 determines the approach rate of the first remote vehicle 64 relative to the second remote vehicle 76 that is directly in front of the first remote vehicle 64. As discussed above, the second remote vehicle 76 moves at slow speeds (e.g., five miles per hour) or is stationary. In the present disclosure, the term "approach rate" means a speed at which the first remote vehicle 64 approaches the second remote vehicle 76 that is directly in front of the first remote vehicle 64 relative to the speed of the second remote vehicle 76 that is directly in front of the first remote vehicle 64. The speeds of the first remote vehicle 64 and the second remote vehicle 76 may be obtained, for example, from the communication transceivers 37 using V2V communication. To determine the approach rate, the controller 34 may subtract the speed of the first remote vehicle 64 from the speed of the second remote vehicle 76 that is directly in front of the first remote vehicle 64. The controller 34 then proceeds to block 108.

At block 108, the controller 34 determines the probability that the first remote vehicle 64 will perform a blind reveal based, at least in part, on the approach rate. As discussed above, a blind reveal occurs when: (1) the host vehicle 10, the first remote vehicle 64, and the second remote vehicle 76 are on a same lane; (2) the first remote vehicle 64 approaches the second remote vehicle 76 while the speed of the second remote vehicle 76 is less than the speed of the first remote vehicle 64; and (3) then the first remote vehicle 64 switches lanes, thereby revealing the second remote vehicle 76 to a vehicle user of the host vehicle 10. The controller 34 may use method 200 (which is discussed below with respect to FIG. 8) to determine the probability that the first remote vehicle 64 will perform a blind reveal. Then, the method 100 proceeds to block 110.

At block 110, the controller 34 determines whether the probability that the first remote vehicle 64 will perform a blind reveal is greater than a predetermined threshold value. The predetermined threshold value may be determined by testing vehicles. Specifically, at block 110, the controller 34 compares the probability that the first remote vehicle 64 will perform a blind reveal with the predetermined threshold value to determine whether the probability that the first remote vehicle 64 will perform a blind reveal is greater than the predetermined threshold value. If the controller 34 determines that the probability that the first remote vehicle 64 will perform a blind reveal is equal to or less than the predetermined threshold value, then the method 100 proceeds to block 112. At block 112, the system 98 does not perform an action. That is, in this case, the controller 34 does not transmit a command signal to the display 29 and, therefore, the display 29 does not display the virtual image 50. If the controller 34 determines that the probability that the first remote vehicle 64 will perform a blind reveal is greater than the predetermined threshold value, then the method 100 proceeds to block 114.

At block 114, the controller 34 determines the position (or location) of the host vehicle 10 relative to the other remote vehicles 67, such as the first remote vehicle 64. To do so, the controller 34 may use the vehicle-location data received from GNSS transceiver 45 and/or roadway data, such as roadway databases. Stated differently, at block 110, the controller 34 determines where the host vehicle 10 is located with respect to the remote vehicles 67. Then, the method 100 continues to block 116.

At block 116, the controller 34 determines, in real time, the type and/or size of the virtual image 50 using, at least in part, the location of the host vehicle 10 relative to the remote vehicles 67. As discussed above, the size of the virtual image 50 may be inversely proportional to the distance from the host vehicle 10 to the second remote vehicle 76. Further, the virtual image 50 may be located in in front of the first remote vehicle 64 to provide an indication that the second remote vehicle 76 is in front of the first remote vehicle 64. Then, the method 100 proceeds to block 118.

At block 118, the controller 34 determines the location of the eyes 66 and/or the head 69 of the user of the host vehicle 10 using at least one input from the user tracker 43. As discussed above, the user tracker 43 may be a camera 41 configured to track the movements of the head 69 and/or the eyes 66 of the vehicle user. The controller 34 then uses the inputs from the user tracker 43 to continuously determine, in real time, the location of the eyes 66 and/or the head 69 of the user of the host vehicle 10. The method 100 then proceeds to block 120.

At block 120, the controller 34 determines, in real time, the location, type, size, shape, and color of the virtual image 50 (FIG. 4) to be displayed on the display 29 (e.g., the multi-focal plane augmented reality display) based on the location of the eyes 66 and/or the head 69 of the user of the host vehicle 10, the remote-vehicle data, and/or the location of the host vehicle 10. As a non-limiting example, the location of the virtual image 50 in the display 29 may change as the user moves the head 69 and/or eyes 66. Further, the size of the virtual images 50 may increase as the host vehicle 10 gets closer to the second remote vehicle 76. Next, the method 100 proceeds to block 122.

At block 122, the controller 34 transmits a command signal to command the display 29 to present at least one virtual image 50 at the previously determined locations. As discussed above, the virtual image 50 is indicative that the second remote vehicle 64 will perform a blind reveal. The virtual image 50 includes a visible alert, such an exclamation mark, that warns the vehicle user of the host vehicle 10 that the blind reveal is probable (e.g., an exclamation mark inside of a triangle). The location of the virtual images 50 may change in real time based on location of the eyes 66 and/or the head 69 of the vehicle user. In response to receiving the command signal from the controller 34, the display 29 shows the virtual image 50 at the previously determined location with the previously determined size. After block 122, the method 100 returns to block 124.

At block 124, the controller 34 determines whether a driving scenario has been completed. In the present disclosure, the term "driving scenario" means a situation where the second remote vehicle 64 performs a blind reveal. Thus, the driving scenario has been completed once the first remote vehicle 64 switches lanes. For example, the driving scenario is completed once the first remote vehicle 64 switches from the first lane 78 to the second lane 80. To determine whether the driving scenario has been completed, the controller 34 may use the remote-vehicle data as discussed above. If the driving scenario has not completed, then the method 100 returns to block 114. If the driving scenario has been completed, then the method 100 continues to block 126.

At block 126, the controller 34 transmits an off signal to the display 29 discontinue showing the virtual image 50 on the display 29. After block 126, the method 100 returns to block 104.

Figure 8:
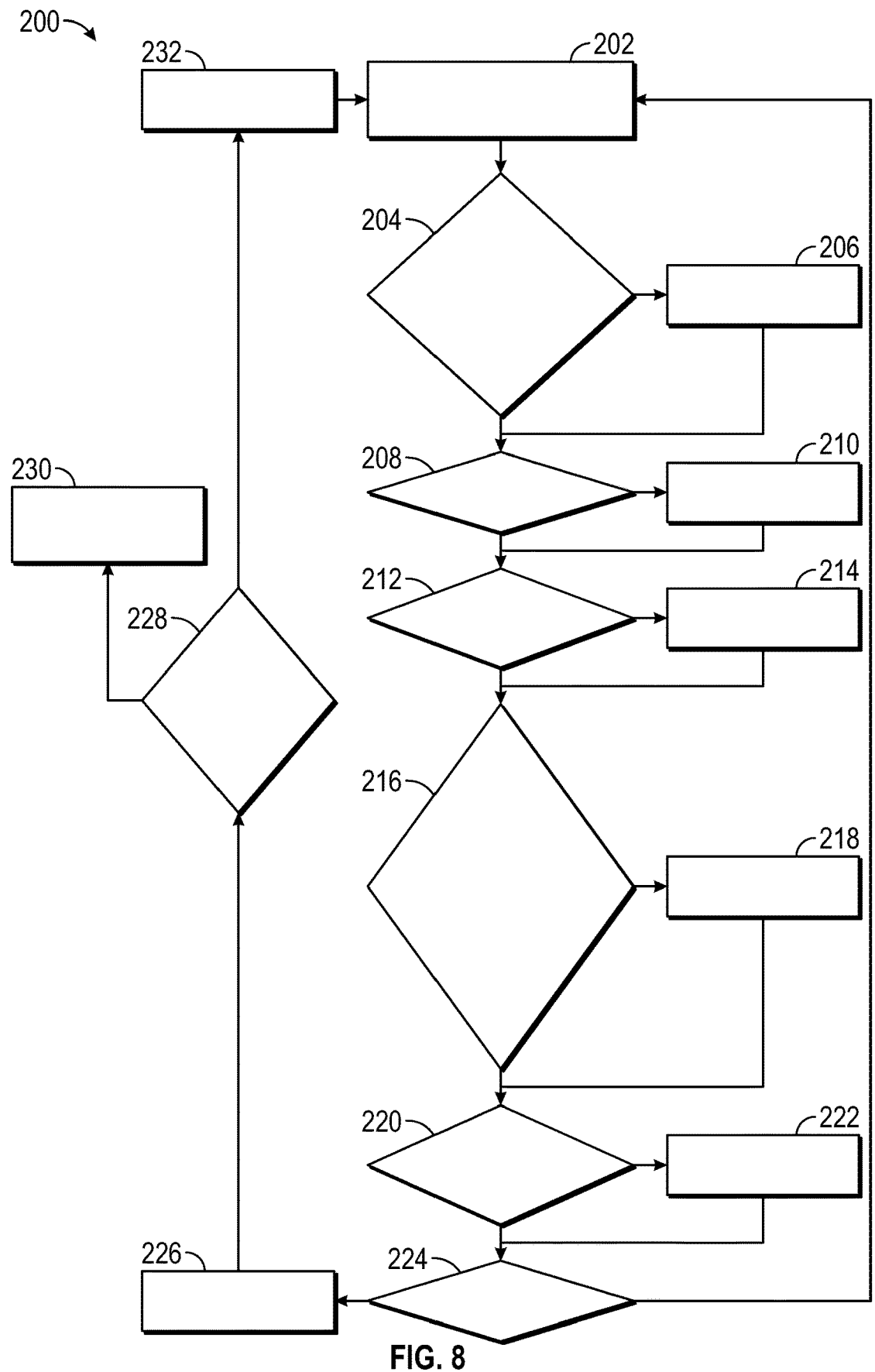
FIG. 8 is a flowchart of a method for determining the probability that the vehicle ahead of the host vehicle will perform a blind reveal.

FIG. 8 is a flowchart of a method 200 for determining the probability that the first remote vehicle 64 ahead of the host vehicle 10 will perform a blind reveal. The method 200 begins at block 202. At block 202, the controller 34 communicates with the first remote vehicle 64 using, for example, the communication transceivers 37. Then, the method 200 proceeds to block 204.

At block 204, the controller 34 determines whether the approach rate of the first remote vehicle 64 relative to the second remote vehicle 76 is greater than a predetermined rate threshold. If the approach rate is greater than the predetermined rate threshold, then the method 200 proceeds to block 206. At block 206, the controller 34 adds a specific predetermined value (e.g., five) to an initial probability that the first remote vehicle 64 will perform a blind reveal. If the approach rate is equal to or less than the predetermined rate threshold, then the method 200 proceeds to block 208 and skips block 206.

At block 208, the controller 34 determines whether the first remote vehicle 64 is coasting based on one or more signal received from the communication transceivers 37 via V2V communications. In other words, the controller 34 of the host vehicle 10 may receive signals from the first remote vehicle 64 using V2V communication to determine that the first remote vehicle 64 is coasting. While coasting, the first remote vehicle 64 moves using momentum. If the first remote vehicle 64 is not coasting, then the method 200 proceeds to block 210. At block 210, the controller 34 adds a specific predetermined value (e.g., five) to the probability that the first remote vehicle 64 will perform a blind reveal. If the host vehicle 10 is coasting, then the method 200 continues directly to block 212.

At block 212, the controller 34 determines whether the brakes of the first remote vehicle 64 are being applied based on one or more signal received from the communication transceivers 37 via V2V communications. In other words, the controller 34 of the host vehicle 10 may receive signals from the first remote vehicle 64 using V2V communication to determine whether the brakes of the first remote vehicle 64 are being applied. If the brakes of the first remote vehicle 64 are not being applied, then the method 200 proceeds to block 214. At block 214, the controller 34 adds a specific predetermined value (e.g., five) to the probability that the first remote vehicle 64 will perform a blind reveal. If the brakes of the first remote vehicle 64 are being applied, then the method 300 proceeds directly to block 216.

At block 216, the controller 34 determines whether the stopping distance from the first remote vehicle 64 to the second remote vehicle 76 considering the current speed of the first remote vehicle 64, the estimated mass of the first remote vehicle 64, and the weather conditions of the roadway 63 exceeds a predetermined distance threshold based on one or more signal received from the communication transceivers 37 via V2V communications. The stopping distance from the first remote vehicle 64 to the second remote vehicle 76 is the maximum distance needed for the first remote vehicle 64 to stop before it comes into contact with the second remote vehicle 76 considering the current speed and the estimated mass of the first remote vehicle 64 and the weather conditions of the roadway 63. If such stopping distance is greater than the predetermined distance threshold, then the method 200 continues to block 218. At block 218, the controller 34 adds a specific predetermined value (e.g., five) to the probability that the first remote vehicle 64 will perform a blind reveal. If the stopping distance is equal to or less than the predetermined distance threshold, then the method 200 continues to block 220.

At block 220, the controller 34 determines whether the second lane 80, which is directly adjacent to the first lane 78 is open, based on one or more signal received from the communication transceivers 37 via V2V communications. If the second lane 80 is open, the method 200 proceeds to block 222. At block 222, the controller 34 adds a specific predetermined value (e.g., five) to the probability that the first remote vehicle 64 will perform a blind reveal. If the second lane 80 is not open, then the method 200 proceeds to block 224.

At block 224, the controller 34 determines whether the turn indication of the second remote vehicle 64 is on based on one or more signal received from the communication transceivers 37 via V2V communications. If the turn indicator of the first remote vehicle 64 is on, then the method 200 proceeds to block 226. At block 226, the controller 34 adds a specific predetermined value (e.g., five) to the probability that the first remote vehicle 64 will perform a blind reveal. If the turn indicator of the first remote vehicle 64 is not on, then the method 200 returns to block 202.

After block 226, the method 200 continues to block 228. At block 228, the controller 34 compares the probability that the first remote vehicle 64 will perform the blind reveal with the predetermined threshold value to determine whether the probability that the first remote vehicle 64 will perform the blind reveal is greater than the predetermined threshold value. If the probability that the first remote vehicle 64 will perform the blind reveal is greater than the predetermined threshold value, then the method 200 continues to block 230. At block 230, the controller 34 executes blocks 114, 116, 118, 120, 122, 124, and 126 as described above with respect to the method 100. If the probability that the first remote vehicle 64 will perform the blind reveal is equal to or less than the predetermined threshold value, the method 200 continues to block 232. At block 232, the system 98 does not perform an action.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for providing a blind reveal warning on a multi-focal plane augmented reality display, comprising:
    receiving remote-vehicle data, wherein the remote-vehicle data includes information about a plurality of remote vehicles, each of the plurality of remote vehicle is located within a predetermined distance from a host vehicle, the plurality of remote vehicles includes a first remote vehicle located directly in front of the host vehicle, and the plurality of remote vehicles includes a second remote vehicle in front of the first remote vehicle;
    determining an approach rate of the first remote vehicle to the second remote vehicle, wherein the approach rate is a speed at which the first remote vehicle is approaching the second remote vehicle relative to a speed of the second remote vehicle;
    determining a probability that the first remote vehicle will perform a blind reveal based on the approach rate, wherein the blind reveal is an occurrence where the first remote vehicle and the second remote vehicle are on a same lane, the first remote vehicle approaches the second remote vehicle while a speed of the second remote vehicle is less than a speed of the first remote vehicle and then the first remote vehicle switches lanes, thereby revealing the second remote vehicle to a vehicle user of the host vehicle;
    comparing the probability that the first remote vehicle will perform the blind reveal with a predetermined threshold value to determine whether the probability that the first remote vehicle will perform the blind reveal is greater than the predetermined threshold value; and
    in response to determining that the probability that the first remote vehicle will perform the blind reveal is greater than the predetermined threshold value, transmitting a command signal to the multi-focal plane augmented reality display of the host vehicle to display a virtual image on the multi-focal plane augmented reality display, wherein the virtual image includes a visible alert that warns the vehicle user of the host vehicle that the blind reveal is probable.

2. The method of claim 1, wherein the remote-vehicle data includes information about a speed, a location, an acceleration, and a trajectory of each of the plurality of remote vehicles.

3. The method of claim 2, further comprising:
determining that the probability that the first remote vehicle will perform the blind reveal is not greater than the predetermined threshold value, and in response to determining that the probability that the first remote vehicle will perform the blind reveal is not greater than the predetermined threshold value, the command signal is not transmitted to the multi-focal plane augmented reality display of the host vehicle.

4. The method of claim 2, further comprising determining a location of the host vehicle relative to the first remote vehicle.

5. The method of claim 4, further comprising:
determining a size and a type of the virtual image based on the probability that the first remote vehicle will perform the blind reveal;
wherein transmitting the command signal to the multi-focal plane augmented reality display includes commanding the multi-focal plane augmented reality display of the host vehicle to display the virtual image on the multi-focal plane augmented reality display with the size and the type previously determined based on the probability that the first remote vehicle will perform the blind reveal.

6. The method of claim 5, further comprising:
determining a location of eyes of the vehicle user of the host vehicle; and
determining a location of the virtual image based on the location of the eyes of the vehicle user;
wherein transmitting the command signal to the multi-focal plane augmented reality display includes commanding the multi-focal plane augmented reality display of the host vehicle to display the virtual image at the location determined based on the location of the eyes of the vehicle user.

7. The method of claim 6, further comprising generating the virtual image at the location previously determined based on the location of the eyes of the vehicle user and with the size and the type previously determined based on the probability that the first remote vehicle will perform the blind reveal, wherein the virtual image is displayed on a windshield of the host vehicle.

8. The method of claim 7, further comprising determining whether a driving scenario is complete, wherein the driving scenario is a situation where a blind reveal takes place, and the driving scenario is complete once the first remote vehicle switches lanes.

9. The method of claim 8, further comprising, in response to determining that the driving scenario is complete, transmitting an off signal to the multi-focal plane augmented reality display to discontinue showing the virtual image on the multi-focal plane augmented reality display.

10. The method of claim 6, further comprising generating the virtual image at the location previously determined based on the location of the eyes of the vehicle user and with the size and the type previously determined based on the probability that the first remote vehicle will perform the blind reveal, wherein the virtual image is displayed on a cluster display of the host vehicle.

11. A system for providing a blind reveal warning on a multi-focal plane augmented reality display, comprising:
a plurality of sensors in a host vehicle;
a transceiver configured to receive V2V communications;
a controller in communication with the plurality of sensors and the transceiver, wherein the controller is configured to:
receive remote-vehicle data from at least one of the transceiver or the plurality of sensors, wherein the remote-vehicle data includes information about a plurality of remote vehicles, each of the plurality of remote vehicle is located within a predetermined distance from a host vehicle, the plurality of remote vehicles includes a first remote vehicle located directly in front of the host vehicle, and the plurality of remote vehicles includes a second remote vehicle in front of the first remote vehicle;
determine an approach rate of the first remote vehicle relative to the second remote vehicle;
determine a probability that the first remote vehicle will perform a blind reveal based on the approach rate, wherein the blind reveal is an occurrence where the first remote vehicle and the second remote vehicle are on a same lane, the first remote vehicle approaches the second remote vehicle while a speed of the second remote vehicle is less than a speed of the first remote vehicle and then the first remote vehicle switches lanes, thereby revealing the second remote vehicle to a vehicle user of the host vehicle;
compare the probability that the first remote vehicle will perform the blind reveal with a predetermined threshold value to determine whether the probability that the first remote vehicle will perform the blind reveal is greater than the predetermined threshold value; and
in response to determining that the probability that the first remote vehicle will perform the blind reveal is greater than the predetermined threshold value, transmit a command signal to the multi-focal plane augmented reality display of the host vehicle to display a virtual image on the multi-focal plane augmented reality display, wherein the virtual image includes a visible alert that warns the vehicle user of the host vehicle that the blind reveal is probable.

12. The system of claim 11, wherein the remote-vehicle data includes information about a speed, a location, an acceleration, and a trajectory of each of the plurality of remote vehicles.

13. The system of claim 12, wherein the controller is further configured to:
determine that the probability that the first remote vehicle will perform the blind reveal is not greater than the predetermined threshold value, and in response to determining that the probability that the first remote vehicle will perform the blind reveal is not greater than the predetermined threshold value, the controller does not transmit the command signal to the multi-focal plane augmented reality display of the host vehicle.

14. The system of claim 12, wherein the controller is configured to determine a location of the host vehicle relative to the first remote vehicle.

15. The system of claim 14, wherein the controller is configured to:
- determine a size and a type of the virtual image based on the probability that the first remote vehicle will perform the blind reveal;
- wherein the controller is configured to command the multi-focal plane augmented reality display of the host vehicle to display the virtual image on the multi-focal plane augmented reality display with the size and the type previously determined based on the probability that the first remote vehicle will perform the blind reveal.

16. The system of claim 15, wherein the controller is configured to:
- determine a location of eyes of the vehicle user of the host vehicle; and
- determine a location of the virtual image based on the location of the eyes of the vehicle user;
- wherein the controller is configured to command the multi-focal plane augmented reality display of the host vehicle to display the virtual image at the location determined based on the location of the eyes of the vehicle user.

17. The system of claim 16, wherein the controller is configured to generate the virtual image at the location previously determined based on the location of the eyes of the vehicle user and with the size and the type previously determined based on the probability that the first remote vehicle will perform the blind reveal, wherein the virtual image is displayed on a windshield of the host vehicle.

18. The system of claim 17, wherein the controller is configured to determine whether a driving scenario is complete, wherein the driving scenario is a situation where a blind reveal takes place, and the driving scenario is complete once the first remote vehicle switches lanes.

19. The system of claim 18, wherein the controller is configured to, in response to determining that the driving scenario is complete, transmit an off signal to the multi-focal plane augmented reality display to turn off to discontinue showing the visible alert on the multi-focal plane augmented reality display.

20. The system of claim 16, wherein the controller is configured to generate the virtual image at the location previously determined based on the location of the eyes of the vehicle user and with the size and the type previously determined based on the probability that the first remote vehicle will perform the blind reveal, wherein the virtual image is displayed on a cluster display of the host vehicle.

* * * * *